March 27, 1956     C. K. NELSON     2,739,545
METHOD FOR MAKING FROZEN CONFECTIONS AND APPARATUS THEREFOR
Filed July 14, 1950     10 Sheets-Sheet 1

INVENTOR,
Christian K. Nelson
By W. Lee Helm
ATTORNEY.

March 27, 1956  C. K. NELSON  2,739,545
METHOD FOR MAKING FROZEN CONFECTIONS AND APPARATUS THEREFOR
Filed July 14, 1950  10 Sheets-Sheet 2

INVENTOR.
Christian K. Nelson
BY
Th. Lee Helms
ATTORNEY.

March 27, 1956     C. K. NELSON     2,739,545
METHOD FOR MAKING FROZEN CONFECTIONS AND APPARATUS THEREFOR
Filed July 14, 1950

INVENTOR.
Christian K. Nelson
BY
ATTORNEY.

March 27, 1956  C. K. NELSON  2,739,545
METHOD FOR MAKING FROZEN CONFECTIONS AND APPARATUS THEREFOR
Filed July 14, 1950  10 Sheets-Sheet 4

INVENTOR.
Christian K. Nelson
BY
W. Lee Helms
ATTORNEY.

March 27, 1956 C. K. NELSON 2,739,545
METHOD FOR MAKING FROZEN CONFECTIONS AND APPARATUS THEREFOR
Filed July 14, 1950 10 Sheets-Sheet 5

INVENTOR.
Christian K. Nelson
BY
ATTORNEY.

March 27, 1956  C. K. NELSON  2,739,545
METHOD FOR MAKING FROZEN CONFECTIONS AND APPARATUS THEREFOR
Filed July 14, 1950  10 Sheets-Sheet 7

INVENTOR.
Christian K Nelson
BY
ATTORNEY.

United States Patent Office

2,739,545
Patented Mar. 27, 1956

2,739,545

METHOD FOR MAKING FROZEN CONFECTIONS AND APPARATUS THEREFOR

Christian K. Nelson, Los Angeles, Calif., assignor to Eskimo Pie Corporation, Bloomfield, N. J., a corporation of Delaware Application July 14, 1950, Serial No. 173,856

6 Claims. (Cl. 107—8)

The object of the invention is to provide a method for rapidly producing ice cream and allied units, with or without stick-holding means projected into the units, and with or without coatings such as chocolate as an example, which is capable of wide variation in the form and size of the frozen units, and which will result in great saving in the cost of production. A further object of the invention is to provide simple and effective apparatus for carrying out the method.

The method is based upon my discovery that when an ice cream mix or other freezable mixture, even when it is of that degree of solidity, by refrigeration, to be plastic and somewhat retain its form, is deposited in a mold or upon any carrier (invariably metallic in the industry) followed by freezing to the usual solid form which permits handling, defrosting can be avoided, and the frozen unit discharged from the carrier whilst the latter retains its chill, provided a critical method step is taken.

In the ice cream industry a very important production volume consists of small units for individual consumption, as for example frozen confections on sticks, and bars and other shapes without sticks, and generally these confections are coated, the coating more extensively used being chocolate. The method has uniformly been to fill molds with the ice cream or other "mix," conduct the freezing by passing the molds through a brine tank, the molds then being removed and dipped into hot water for defrosting the confections from the walls of the mold cavities, followed by coat-dipping or otherwise coating the confections, hardening and bagging. When sticks are employed, stick racks each holding a plurality of sticks, generally twenty-four (24) in number to correspond with a like number of the mold cavities, are positioned with the sticks projected into the ice cream or other mix, and at the end of the freezing, the stick holders, bonded to the ice cream confections, are used as carriers for lowering the molds into the hot water for defrosting, for withdrawing the confections from the mold cavities, and for dipping the confections into the coating material. The present method is such as to eliminate the necessity for molds and their filling, to eliminate a brine tank and the necessary defrosting, to eliminate stick racks, and to greatly reduce the time and the cost of ice cream and allied frozen confection production.

The critical step on which my method is largely based is the maintenance of a moving carrier, preferably metallic, at a temperature not higher than about —30° F. or below, at the time the mix to be frozen is deposited on the metallic carrier, followed by continuing the movement of the confection, under said low temperature, through a freezing zone until the confection is sufficiently solid to permit handling. When the confections are to carry sticks, the sticks are automatically projected into the confections at a given point of their progression through the chamber employed for freezing, and when such a stick confection is to be coated, the coating is effected in a simple manner which insures that the stick will be properly protected against receiving the coating material, the entire operations being continuous and automatic.

Prior to specific reference to the accompanying drawings, it will be desirable to generally outline the method and apparatus, as follows: An ice cream mix is fed from a continuous freezer, with the freezing controlled to discharge the ice cream in such plasticity as to somewhat maintain the form of portions severed from the discharge throat of the freezer. Portions can be rapidly cut off and dropped to a moving metallic belt, without adherence to the belt, because the belt is maintained at a critically low temperature, preferably at about —35° F. The belt is moved within a refrigerated chamber, properly insulated and provided with refrigerant coils, together with a blower for circulating the cold air.

The operation is as follows in the making of ice cream bars on sticks:

The unit equipped for handling the output of a single continuous freezer, indicated in the drawings, is a chamber which may be (without limitation) approximately twelve (12) feet long, three (3) feet wide, and five (5) feet high, having fiber-glass or other efficient insulation applied to its walls. Within the chamber are a plurality of driven continuous belts, each preferably made of a strip of stainless steel. These may be perforated at their margins in the manner of a motion picture film in order to be engaged by sprocket feed teeth or may be directly engaged and driven by pulleys, as shown on the drawings.

At the top of the chamber is an opening (cold air being heavy will be maintained within the box). Above the opening are two reversely moving cutting wire carriers. The cutting wires may be resistance wires through which an electric current is passed. Immediately above the wires is a throat or ice cream unit former, the throat being shaped according to the desired confection, as for example a wedge-shaped bar. In exactly timed relation the ice cream emerging from the throat is cut off and passes downward, any two inches onto the upper length of the first metallic belt. The speed is preferably so controlled that in one minute the ice cream bar will travel to the far end of the first belt.

Near the end of the first belt and at the side of the chamber is an automatic stick inserting mechanism feeding, from an exposed stack of sticks. At this point, the ice cream will be in condition to receive the sticks, and they will be satisfactorily held.

The stick injector is of that type which gives repeated rapid stresses each exactly of the same force. The successive partially frozen bars will be of the same physical character and they are initially cut from ice cream in plastic condition entirely different from the usual form of free flowing ice cream mix.

At the end area of the first metallic belt and at one side thereof are two narrow endless belts having a speed exactly the same as the metallic belt carrier for the ice cream bars or other shaped confections. The sticks pass between those small belts and are gripped and fed at exactly the speed of the ice cream bars, so that there will be no derangement or lateral pressure upon the sticks relative to the bars. At the said end of the first belt the latter is bent into a curvature and this successively releases the ice cream bars from the belt, and the gentle control of the sticks enables the bars to be delivered on top of the second metallic belt. The speed of refrigeration is greatly increased by direct contact of the ice cream with the chilled metallic surface. By means of the second belt the bars are reversed as to face of contact. The refrigeration continues on the five belts until the bars, successively, are ready for discharge. They are then firm and can be freely handled. Thus, upon release from the final belt, the confections may pass to an enrober, thence to a chilled box, to be discharged therefrom into bags.

The discharge throat of the continuous freezer may be formed with a plurality of openings of the desired shape, so that a plurality of confections may be cut off simultaneously and dropped in a straight row upon the initial belt. In such case the stick-control narrow belts move idly and the confections may pass to a conventional type enrobing unit.

The invention will be described with reference to the accompanying drawings, in which.

Figure 1:
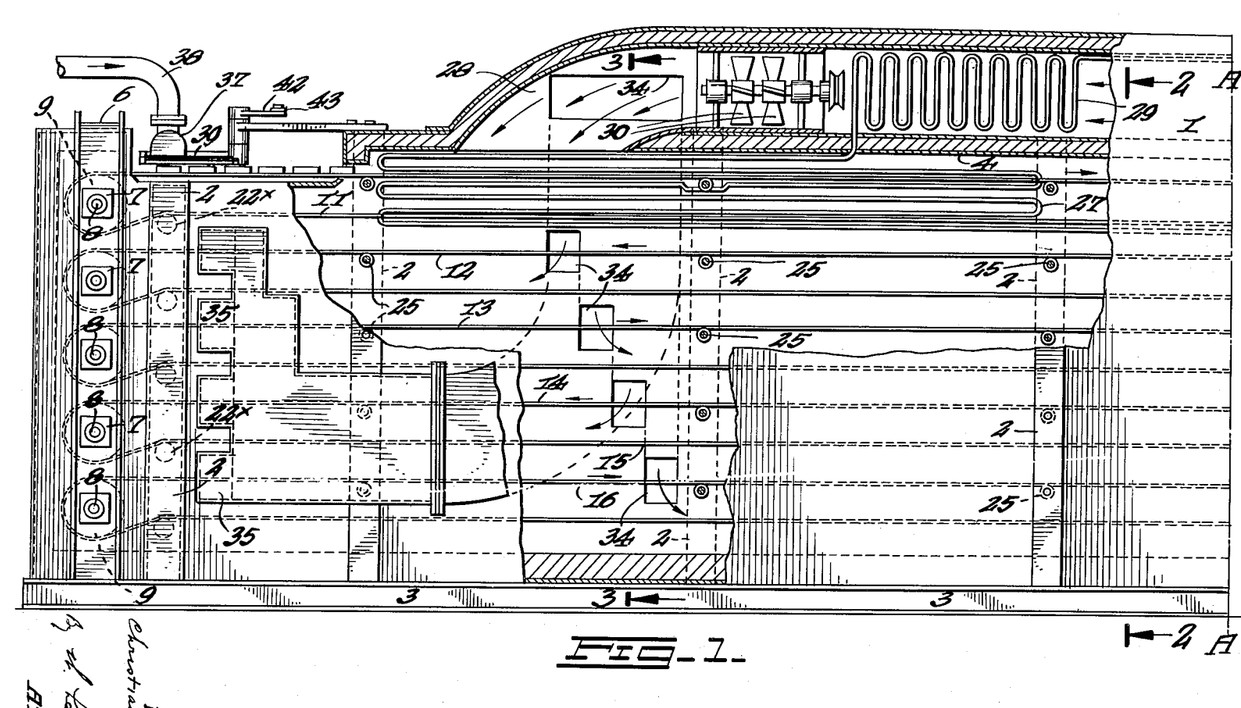
Fig. 1 is a view in elevation, partly broken away, showing the left-hand portion of an apparatus for carrying the method into effect.
Figures 1A, 23:
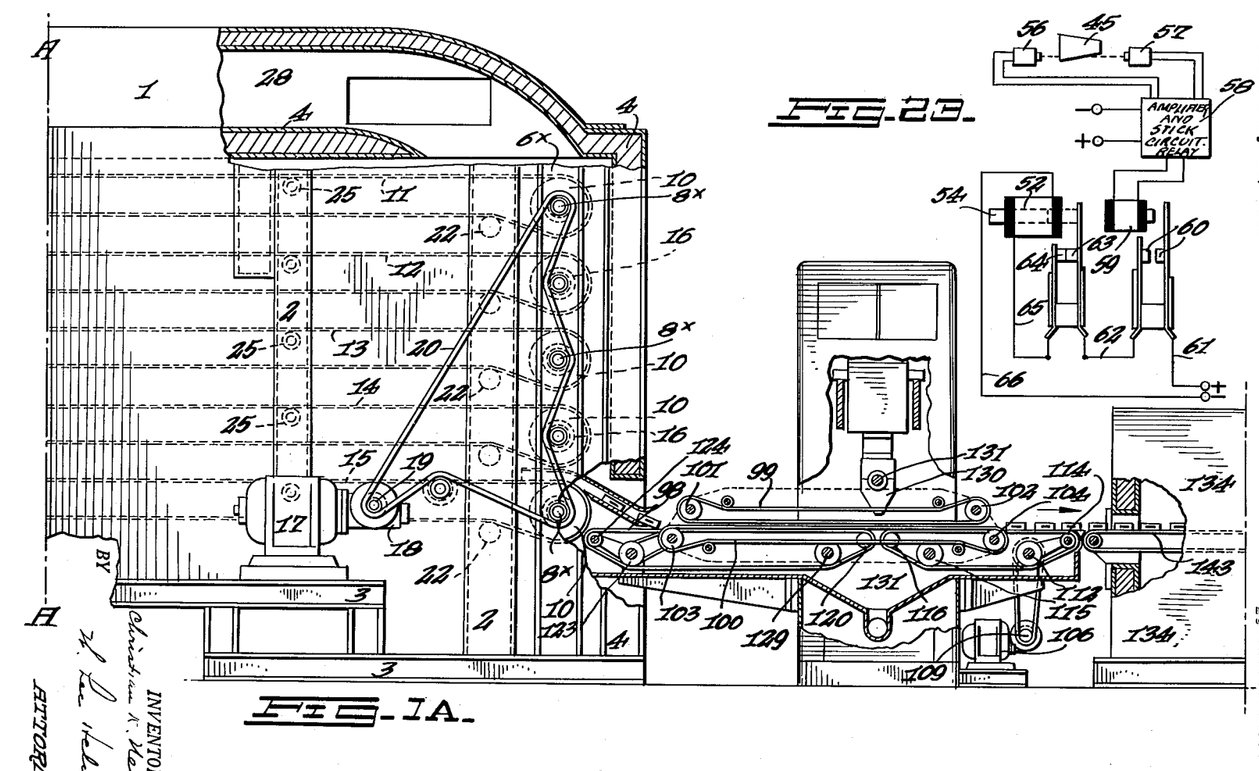
Fig. 1A is a view similar to Fig. 1 showing the right-hand end of the apparatus including an enrobing unit of special form and the receiving end of a hardening box.
Fig. 23 is a view of the electrical system used in this invention.

Referring to Figs. 1 and 1A, there is indicated at 1 a refrigerating chamber which will preferably have readily removable wall sections carried by vertical standards 2, rising from a supporting framework 3. The walls will be hollow and filled with suitable insulating material. The intermediate top wall 4 may be fixed in position, as well as the bottom wall 5.

At the front end of the apparatus are two spaced vertical beams, one of which is indicated at 6, Fig. 1. Each beam carries a bearing block 7, followed by corresponding spaced blocks for supporting shafts 8 which carry, in the present embodiment, five pulleys 9. At the right-hand end of the apparatus are a pair of similar upright beams $6^\times$, which carry five corresponding shafts $8^\times$, suitable bearing members for the shafts being provided as customary in such cases. Shafts $8^\times$ carry five pulleys 10.

The uppermost pulleys carry a feed belt 11, and the remaining pulleys carry feed belts 12, 13, 14, 15 and 16.

Figure 15:
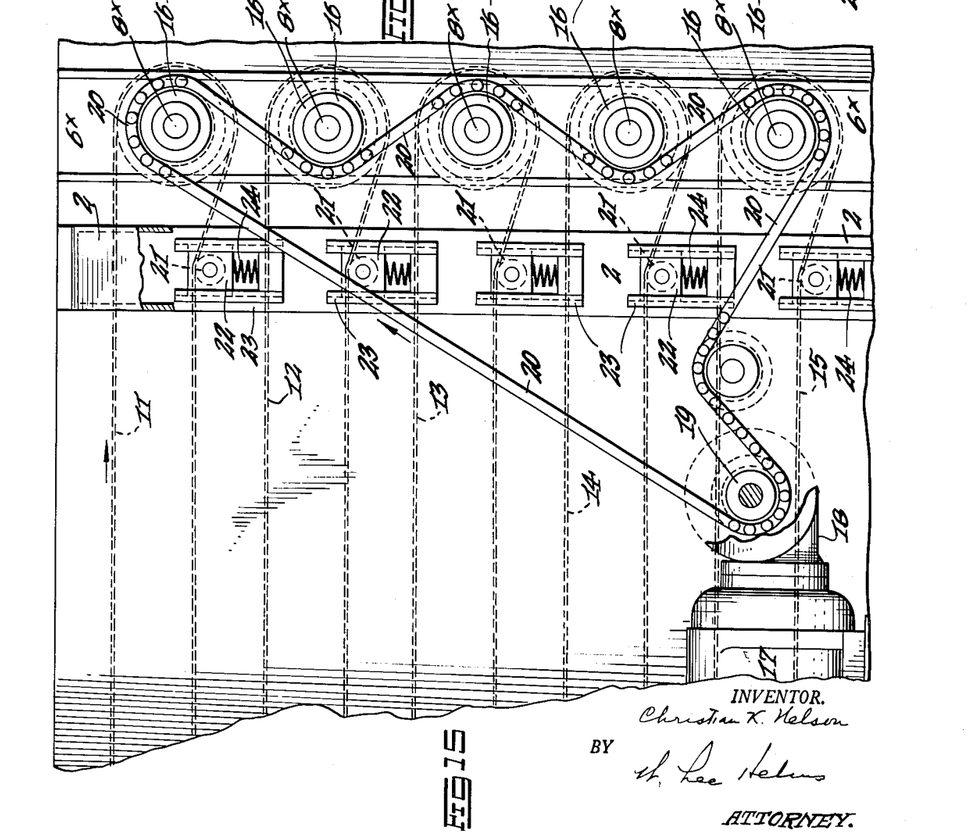
Fig. 15 is an enlarged view, in elevation, partly broken away and partly in dotted lines, showing the drive for the feed belts and their catenary tensioning devices, the view being an enlargement of the right-hand end of the apparatus.
Figure 16:
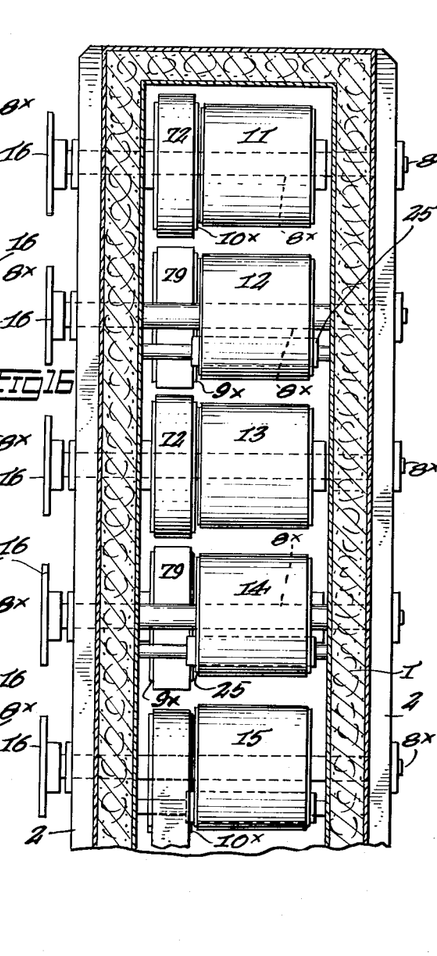
Fig. 16 is a vertical section taken rearwardly of the feed belts and their pulleys, with relation to Fig. 15.

The feed belts may be driven, as shown in Fig. 1A, so that the feed belts are successively driven in opposite directions. To such end the shafts $8^\times$ carry sprockets 16, which are preferably carried exterior the appropriate side wall of the chamber, as indicated in Figs 15 and 16. As shown in Fig. 1A, a motor 17 is mounted on a sub-frame 18, and through a usual reduction drive indicated only diagrammatically at 18, rotates a sprocket 19 which carries a sprocket chain 20 led over the pulleys 16 in such manner as to drive the feed belts successively in opposite directions.

The feed belts are preferably continuous webs of stainless steel or hardened and polished aluminum alloy. In order to maintain each belt under proper tension with respect to its pulleys, it is preferred that the return length, or catenary, of each feed belt be engaged by a tensioning roller 21 (Fig. 15). Thus there will be five tensioning rollers, each carried by a pair of slide blocks 22, and each block will be mounted in vertical slideways 23 under the pressure of a spring 24. Similar tensioning rollers, $22^\times$, may be employed at the front part of the apparatus.

The upper length of each belt may be given intermediate support by a plurality of supporting rollers carried by certain of the uprights 2, as indicated at 25.

Figure 2:
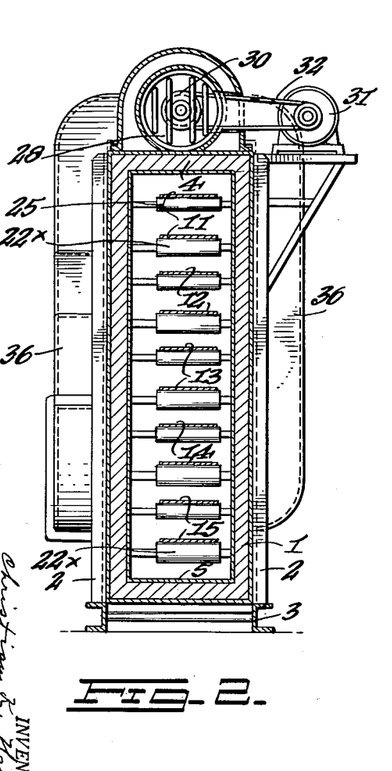
Fig. 2 is a vertical section, on the line 2—2, Fig. 1.
Figure 3:
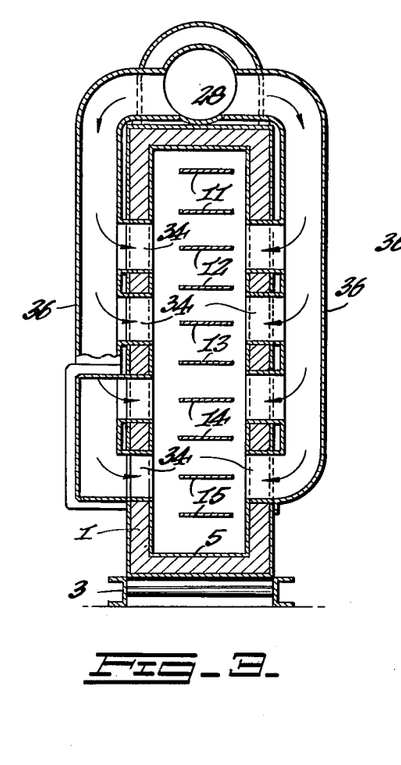
Fig. 3 is a vertical section, on the line 3—3, Fig. 1.
Figure 4:
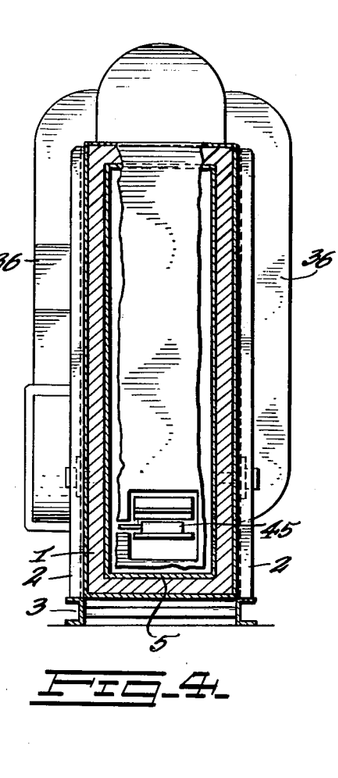
Fig. 4 is a vertical section taken generally on the line 4—4, Fig. 1A, but with part of the front wall being shown in full lines.

The uprights 22 or the walls themselves may support refrigeration coils, a portion or coil unit being indicated at 27 (Fig. 1), and these coil units may extend from top to bottom of the chamber, at each side thereof. In addition there is provided, above intermediate wall 4, a force-feed duct 28 which contains a refrigeration coil or coils 29 and a blower 30 driven from a motor 31 (Fig. 2) by a belt 32. The said coil or coils will be of high capacity because air is drawn thereto from the discharge end of the apparatus, as shown in Fig. 1A, and that air must be distributed over adequate areas of all of the feed belts, to maintain them within the critical temperature range. To that end the blower 30 forces air chilled below the critical temperature and preferably at least 5° below the critical, through a series of ducts at 34, in opposed side walls of the chamber, and also through suitable ducts at 35 forwardly thereof, these ducts communicating with duct 28 and pipes 36, Figs. 2–4 inclusive and 8. Thus the heat from the confections transmitted to the feed belts and the air, is withdrawn by the air, under force feed, to a refrigeration coil or coils of high capacity, and the air thus brought down at least to the critical temperature, and preferably below the same, is recirculated. Any suitable means for this purpose may be employed, the example shown in the drawings being merely illustrative.

Figure 8:
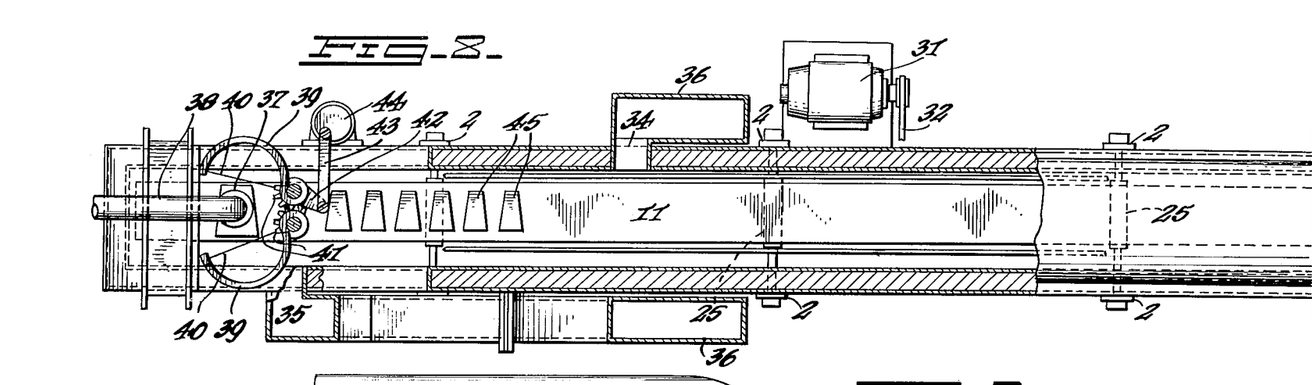
Fig. 8 is a top plan view of the left-hand portion of the apparatus, partly broken away, generally along the lines 8—8, Fig. 9.

Again referring to Fig. 1, it will be seen that the upper feed belt in its initial movement has its upper length brought under the throat 37 of a discharge pipe 38, leading from a continuous freezer, the latter being so controlled that the ice cream or similar material, is in a plastic condition, so that a section, cut off from the ice cream emerging from the throat, will substantially retain its form, although it may be dropped a short distance. Immediately below the throat is a cut-off device which in the present embodiment, and as shown more particularly in Fig. 8, is double-acting in the sense that it cuts off a section on each of its inward and outward movements. The device consists of two curved arms 39, each carrying a cutting wire 40 in such manner that they are exceedingly close to each other when they pass one another. The arms are inter-geared by gears 41, and one of the arms carries a lever 42 connected by a link 43 eccentrically connected to a rotating head 44. The wires 40 may be resistance wires and continuously heated by an electric current.

Figure 9:
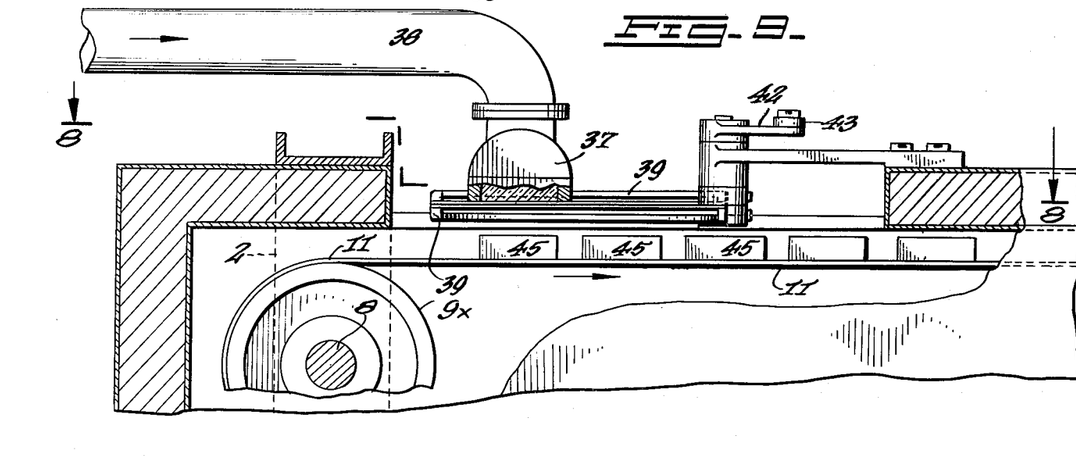
Fig. 9 is an enlarged vertical portion of the apparatus at its receiving end, and partly in vertical section.

The throat 37 would have the form of the confection desired. In the example shown by the drawings that form is wedge-shaped for the production of ice cream bars or the like, which will subsequently receive sticks. Sections of ice cream or the like emerging from the throat will be cut off in timed relation to the movement of the belt, so that the confections will be deposited thereon in spaced relationship, such wedge-shaped confections being shown at 45, Fig. 8, and on each stroke of the cut-off device one of the plastic wedge-shaped pieces will be deposited on the upper length of the feed belt 11, as shown in Figs. 8 and 9.

The feed belt 11 travels to the right, with respect to its upper length. When sticks are to be inserted each confection unit will come into register with stick-inserting mechanism, preferably controlled by an electric eye. In the present embodiment it may be considered that a confection placed on belt 11 will near the right-hand end of the belt in about one minute. Under the intense refrigeration provided, the confection then will be in good condition to receive the stick, without undue force.

Figures 20, 21, 22:
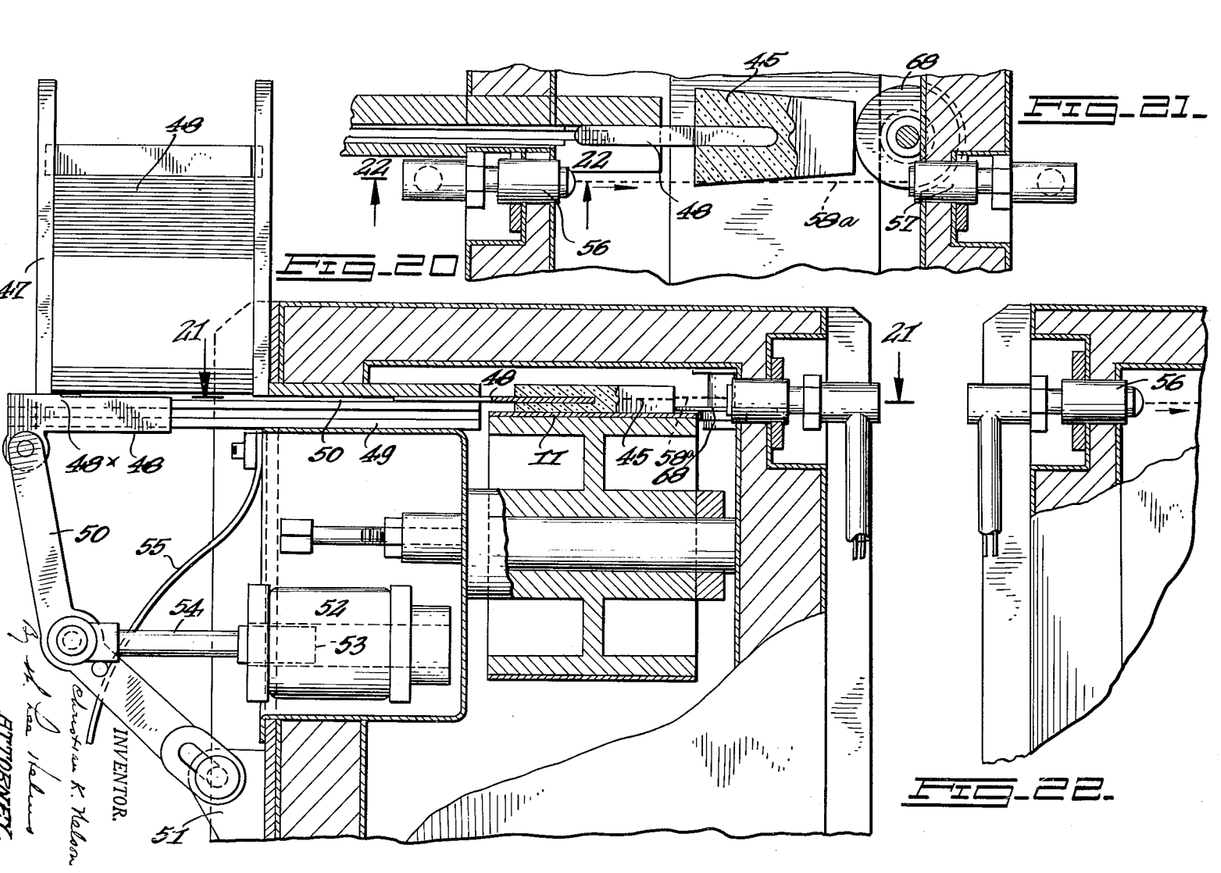
Fig. 20 is an enlarged vertical section taken near the right-hand end of the first feed belt, and showing the stick-inserting mechanism.
Fig. 21 is a horizontal section taken generally on the line 21—21, Fig. 20.
Fig. 22 is a detailed view, partly in horizontal section, on the line 22—22, Fig. 21.

The stick-inserting mechanism is illustrated in Figs. 21 and 22, with relation to the wiring diagram shown in Fig. 23. Mounted exterior to the chamber wall is a holder 47 for a stack of the usual wood sticks 48. These sticks are so positioned that upon the final left-hand movement of a shouldered plunger 48, the lowermost stick will drop, so that the outer end thereof will be abutted by the shoulder 48×. Plunger 48 reciprocates in a guide member 49, above which is a channel at 50, the walls of which guide the stick. The plunger is pivotally connected to a lever 50, the latter being mounted to swivel on a bracket 51. The lever is given an active movement by a solenoid 52 through the inward movement of its core 53 and an actuating rod 54 pivotally connecting lever 50 and the solenoid core. A spring 55 normally holds the plunger outwardly and ready to engage a stick.

As shown in Fig. 21, the casing wall adjacent the guide for the stick carries the beam-emitting member 56 such as an incandescent lamp of an electric eye of well known construction, which also includes the beam-receiving member 57 such as a selenium cell of well-known type, the path of the beam being indicated by the dotted line 58a in this view.

Reference to Fig. 23 will show the action of the electric eye control for the solenoid 52. Immediately upon the movement of a confection 45, by feed belt 11, to a position where the beam 58a is obstructed by the confection, it will be seen, by reference to Fig. 23, that a circuit, normally broken by the beam of light and leading from amplifier-relay 58, will close the circuit through electro-magnet 59, which in turn will close flexible leaf spring contacts 60. Thereupon current will flow from the positive lead 61 to lead 62, and through flexible leaf spring contacts 63 and 64 to lead 65, and from the solenoid 52 through return lead 66, incidentally causing the solenoid core 53 to move inwardly and the plunger-actuating rod 54 to have corresponding movement, with the result that in a minute interval of time following the obstruction of the beam, the stick is projected into the confection so rapidly that, by inertia, particularly when a minor degree of resistance is provided (as by a rotating wheel 68 or similar device), the position of the confection will not be disturbed. Immediately upon the passage of the confection beyond the beam, the latter will act upon the relay 58 to open the circuit, and spring 55 will restore the plunger to initial position. The contacts 63 and 64 are held closed by the action of core 54 of electromagnet 52 upon a leaf spring to which contact point 63 is attached. It will be understood that any other suitable control for the stick-injecting mechanism may be provided.

Figure 10:
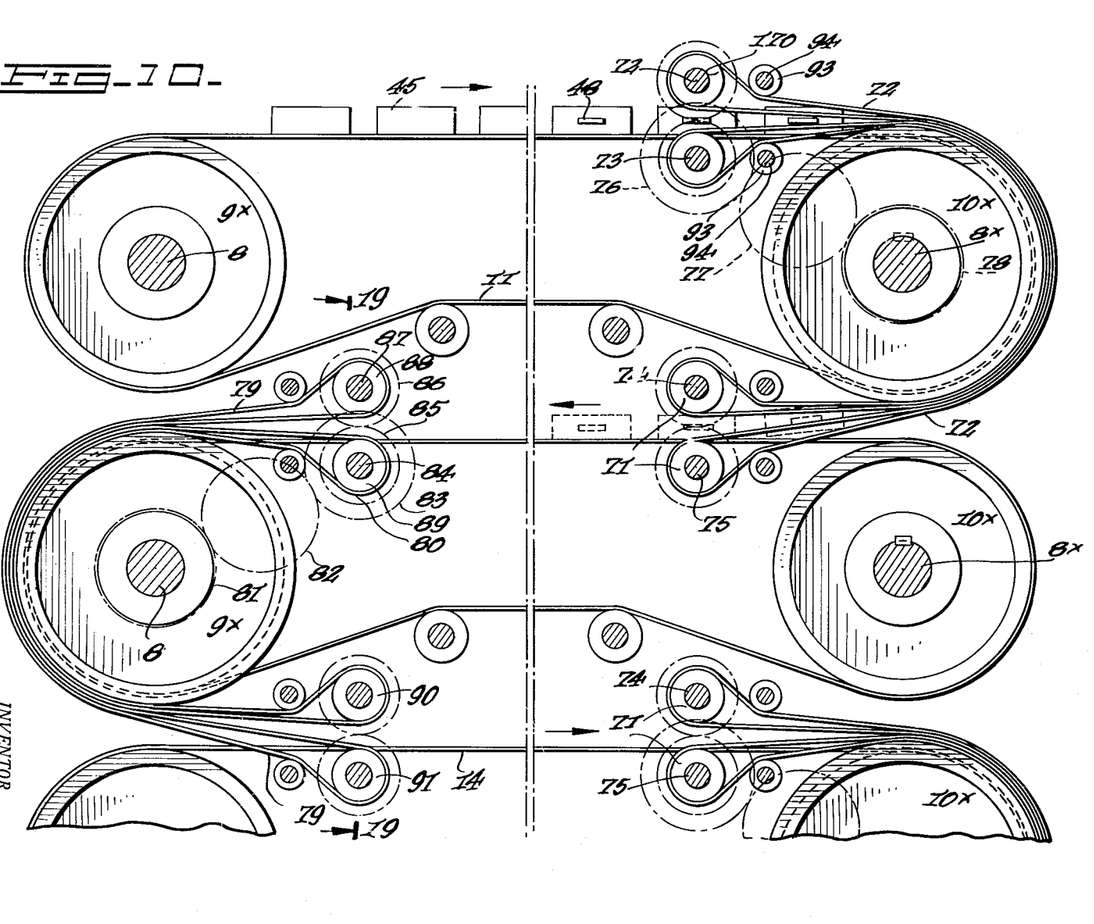
Fig. 10 is an enlarged side elevation, showing the initial feed belt and two underlying feed belts, together with the stick-engaging narrow belts and drive and supporting pulleys and rollers, the view being shortened by breaking the belts away at their centers.
Figures 11, 13:
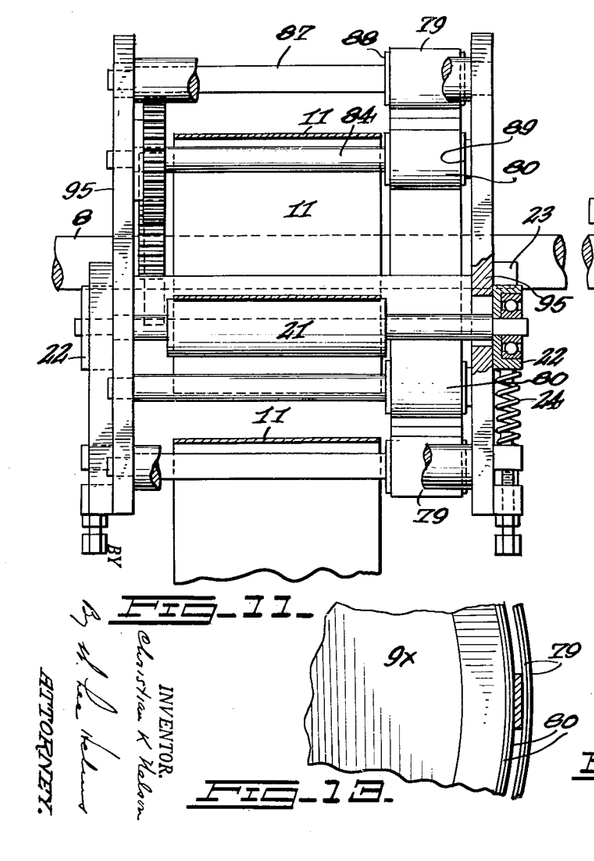
Fig. 11 is a vertical section taken generally on the line 11—11, Fig. 18.
Fig. 13 is a fragmentary view in side elevation showing a portion of one pulley for two of the narrow stick-engaging belts, with a stick (shown in section) gripped therebetween.
Figure 12:
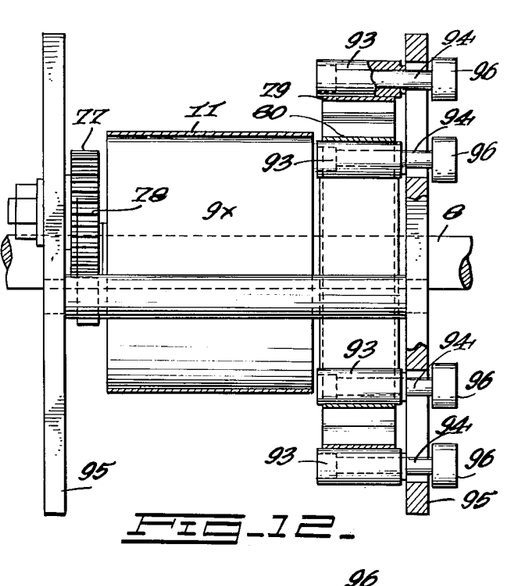
Fig. 12 is a vertical section taken generally on the line 12—12, Fig. 18.
Figures 17, 18, 19:
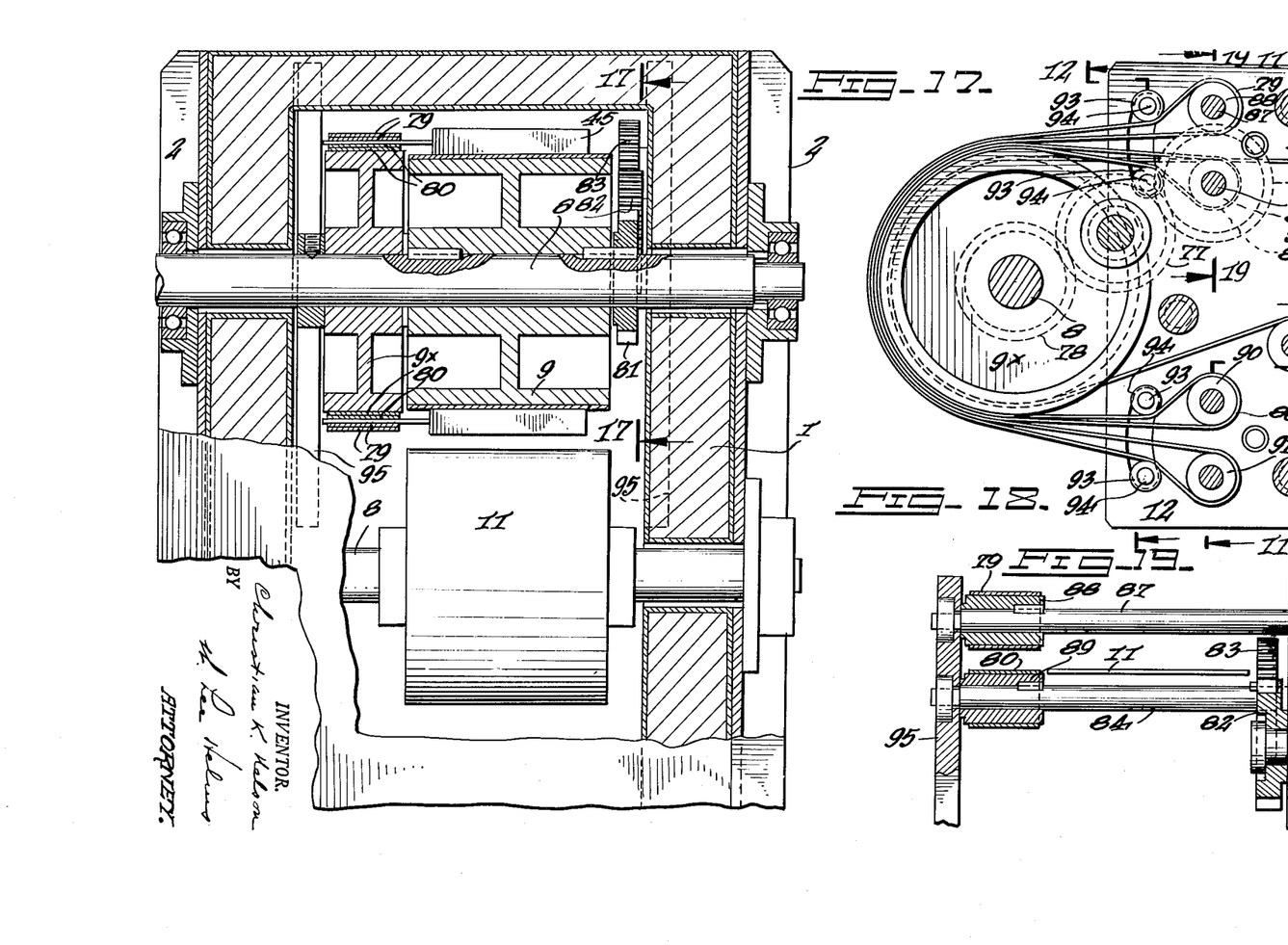
Fig. 17 is a side elevation showing that end of a drive belt and its pulley to which is applied on the pulley shaft a narrow pulley and plural narrow belts for the engagement of the sticks.
Fig. 18 is a view in elevation, partly in vertical section, showing the structure of Fig. 17 within the chamber, an underlying pulley being shown in the figure.
Fig. 19 is a detailed view in vertical section taken on the line 19—19, Fig. 18.

Referring to Figures 10, 17, and 18, it will be seen that as the stick-held ice cream bars 45 reach the right-hand end of the first feed belt, the sticks are received within a gripping space provided by two narrow belts, which act upon the sticks with a gentle feeding action until the confections are released and deposited upon an underlying belt for movement in a reverse direction. In Fig. 10 the first feed belt, 11, is shown at the top of the figure, and it will be understood that each feed belt assembly is the same in construction. Led around upper spaced pulleys 170 and lower spaced pulleys 71 are two endless feed belts 72. These feed belts are led over a narrow pulley 10×. The small pulleys 170 are on shafts 72, 73, and the small pulleys 71 are on shafts 74 and 75. Shaft 73 carries a gear 76 in mesh with a gear 77 driven by a gear 78 on shaft 8×. Pulley 10× lies adjacent the right-hand main belt pulley, which is on shaft 8× and that shaft thus transmits motion to the narrow stick-feeding belt. Thus the sticks are fed around the circumference of the narrow pulley 10× at exactly the same speed as the speed imparted to the appropriate feed belt until the sticks leave the main feed belt, for example feed belt 11, and are deposited upon the underlying feed belt, for example belt 12.

At the left-hand end of the feed belt 12 exactly the same stick-feeding assembly is provided, and so on until the stick confections are discharged from the lowermost feed belt.

As the stick belt bar reaches the left-hand end of feed belt 12, the stick passes between two narrow stick feeding belts 79 and 80 and as those belts ride over narrow belt pulley 9× the sticks are gripped and the confections finally are released on to belt 14. The narrow pulley 9× is on shaft 8 which carries the feed belt pulley 9, and the latter is on shaft 8. Shaft 8 carries a gear 81 in mesh with a gear 82 which drives a gear 83 on shaft 84. The latter carries a gear 85 in mesh with a gear 86 on shaft 87 over which narrow belt 79 passes via narrow pulley 88. On shaft 84 is a narrow pulley 89 which carries belt 80. At its lower length belt 80 rides over a pulley 90, and the corresponding length of belt 79 rides over a pulley 91.

Figure 14:
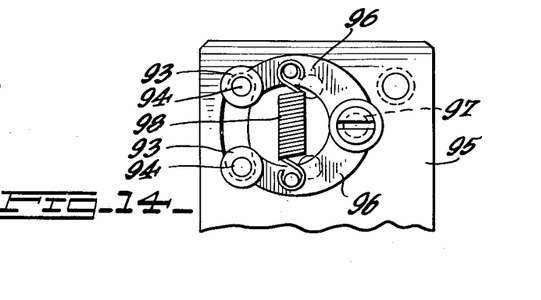
Fig. 14 is a view in side elevation showing one of the narrow belt tensioning members.

A pair of tensioning rollers may be applied to the narrow belts at their upper lengths and at their lower lengths. These pairs of rollers are the same throughout the assembly and each pair is indicated by the numerals 93. They are on shafts 94. As shown in Figure 17 these shafts are guided by the walls of a narrow slot which may be formed in a frame plate 95 at each side of the machine. Each shaft may be carried by a curved arm 96 pivoted at 97 on the appropriate frame plate 95 and the arms may be pressed towards each other by a spring 98, as shown by the detailed view, Fig. 14.

Figures 5, 7:
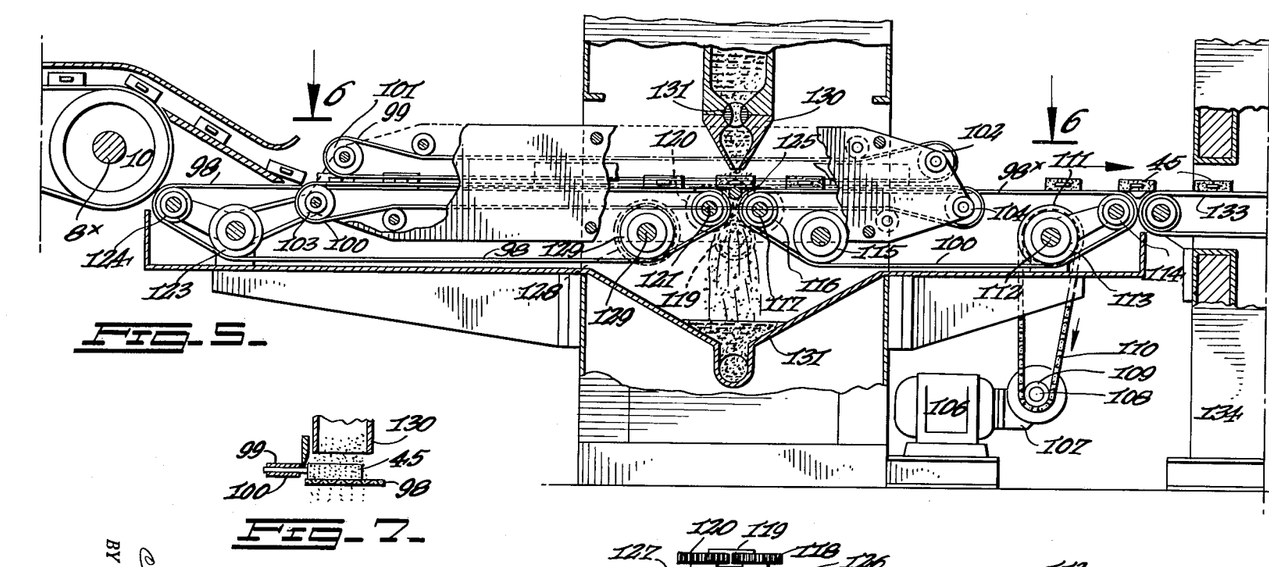
Fig. 5 is an enlarged view in elevation, partly broken away, showing the discharge end of the apparatus and the enrobing assembly, etc.
Fig. 7 is a schematic section taken vertically through the coating nozzle discharge, showing a stick-held confection on the underlying screen belt, with the stick gripped and protected by the narrow stick-feeding belts.
Figure 6:
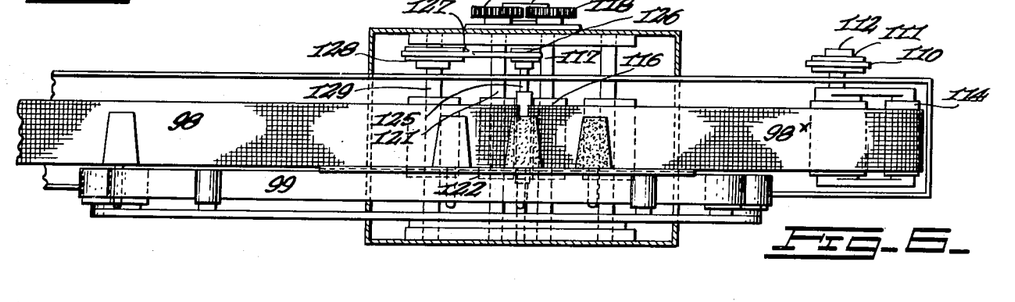
Fig. 6 is a horizontal section, on the line 6—6, Fig. 5.

When the confections are discharged from the lowermost feed belt 15 (Figs. 1–A and 5) they fall upon the first mesh belt 98 of an enrober employing spaced mesh belts, the second mesh belt being shown at 98×. The sticks are gripped between two narrow stick feeding and protection belts 99 and 100. Belt 99 is led over a roller 101 at its front end and over a roller 102 at its rear end. Belt 100 is led over roller 103 at its front end and over a roller 104 at its rear end. Both of these relatively narrow stick feed and protection belts may be positively driven, although one may be driven by contact with the sticks pressed against it by the second belt.

The arrangement shown in the drawing is that of a positive drive for the second mesh belt 98× and the transmission of movement from said second mesh belt to the first mesh belt and to the stick feed and protection belts, in the following manner, reference being made to Figs. 5 and 1–A:

On a suitable base is mounted a motor 106 which carries a sprocket 109 through which motion is transmitted to a chain 110. Chain 110 runs over a sprocket 111 on a shaft 112 which carries a driving roller 113 for the second mesh belt 98×, the latter running from its upper length over a guide roller 114, thence to guide rollers 115, 116, and thence forward to roller 114.

Feed roller 116 is on a shaft 117 which carries the gear 118 in mesh with an underlying gear 119 which is in mesh with the gear 120 on a shaft 121 which carries a feed roller 122 for the forward end of mesh belt 98. The rear end of mesh belt 98 is led over rollers 123 and 124 and then extends forwardly at its upper length to roller 122.

The two mesh belts are slightly separated a distance sufficient to enable the placement of a rotating bottom-applicator for the ice cream units. This applicator is a rod 125 which carries a sprocket 126 driven by belt 127 from a pulley or sprocket wheel 128, the latter being carried by shaft 129, upon which is mounted a roller which is driven by frictional contact with the lower length of mesh belt 98.

Above the bottom-applicator roller 125 is the discharge throat 130 leading from a chocolate or other coating supply, and equipped with a shut-off valve 131. The excess chocolate or other coating material, after passing over the surface of the ice cream unit, and the applicator roller 125, passes downward to a trough at 131, from whence it may be pumped back to the supply.

The coated ice cream units may be discharged from mesh belt 98× on to a feed belt 133 for carrying the coated confections into a chill room generally indicated at 134.

It will be understood that various modifications may be made in the form and arrangement of the elements constituting the embodiment of the invention illustrated in the drawings described above, without departing from the spirit of the invention, what I claim and desire to secure by Letters Patent, being as follows:

1. A method of forming frozen confections comprising feeding plastic edible organic material into a spout, cutting off said plastic edible material at the mouth of said spout, and dropping said cut edible material onto a super-cooled solid surface having a temperature of about −30° F. or below, thereby congealing instantaneously the entire film of contact of said edible material to form a hard and substantially non-adhering film between said solid surface and said cut edible material and refrigerating said bodies to the degree of non-plastic solidification.

2. The process of claim 1, in combination with the step of removing said edible partially congealed confection from the super-cooled surface, and depositing said removed confection on the diametrically opposed side onto a super-cooled surface having a temperature of not higher than about −30° F.

3. A method of forming frozen confection having a flat side, employing a flat surface in the solidification of said confection, comprising depositing said confection at its flat side instantaneously and completely onto surface refrigerated at a temperature of not higher than about −30° F., and refrigerating said confection to the degree of non-plastic solidification.

4. Apparatus for making ice cream and allied frozen confections by quantity production, consisting of an insulated chamber, a plurality of endless belts in said chamber and coacting successively to advance the confections through said chamber, means for moving the same successively in reverse directions, a forming throat adapted for receiving a partially frozen mix from a continuous freezer, means for successively severing sections of said mix at the forming throat, whereby said sections are deposited upon the upper run of the first endless belt, the endless belts being in horizontal superimposed position, means adjacent one of the belts for projecting sticks into the confection, pairs of narrow stick-gripping belts adjacent the turns of a plurality of the confection supporting and feeding belts, for conveying the confections from one endless belt to another, refrigeration coils in said chamber, means for circulating refrigerated air in said chamber, and means including the last endless belt in said chamber for discharging solidified confections from the chamber.

5. Apparatus for making ice cream and allied frozen confections by quantity production, consisting of an insulated chamber, a plurality of endless belts in said chamber and coacting successively to advance the confections through said chamber, means for moving the same successively in reverse directions, a forming throat adapted for receiving a partially frozen mix from a continuous freezer, means for successively severing sections of said mix at the forming throat, whereby said sections are deposited upon the upper run of the first endless belt, means adjacent one of the belts for projecting sticks into the confections during their movement on said belt, means engaged by these sticks at the turns of a plurality of the confection supporting and feeding belts for guiding the stick-held confections at said turns whereby in each pass of a confection from one belt to a reversely moving belt, the belts being superimposed, the previously exposed face of the confection is brought into direct contact with said reversely moving belt, refrigeration coils in said chamber, means for circulating refrigerated air in said chamber, and means including the last endless belt in said chamber for discharging solidified confections from the chamber.

6. Apparatus for making ice cream and allied frozen confections by quantity production, consisting of an insulated chamber, a plurality of endless belts in said chamber and coacting successively to advance the confections through said chamber, means for moving the same successively in reverse directions, a forming throat adapted for receiving a partially frozen mix from a continuous freezer, means for successively severing sections of said mix at the forming throat, whereby said sections are deposited upon the upper run of the first endless belt, the endless belts being in horizontal superimposed position, means adjacent one of the belts for projecting sticks into the confections, pairs of narrow stick-gripping belts adjacent the turns of a plurality of the confection supporting and feeding belts, pulleys carrying the confection supporting endless belt, shafts carrying said pulleys and pulleys on said shafts carrying the narrow stock-gripping belts, refrigeration coils in said chamber, means for circulating refrigerated air in said chamber, and means including the last endless belt in said chamber for discharging solidified confections from the chamber.

References Cited in the file of this patent

UNITED STATES PATENTS

| | | |
|---|---|---|
| 797,276 | Glauser | Aug. 15, 1905 |
| 1,487,788 | Lombardo et al. | Mar. 25, 1924 |
| 1,744,884 | Greiner | Jan. 28, 1930 |
| 1,810,863 | Vogt | June 16, 1931 |
| 1,812,242 | Jensen | June 30, 1931 |
| 1,883,482 | Bausman et al. | Oct. 18, 1932 |
| 1,936,584 | Cobb | Nov. 28, 1933 |
| 1,960,456 | Robb | May 29, 1934 |
| 2,032,812 | Quattrin et al. | Mar. 3, 1936 |
| 2,113,575 | Decker | Apr. 12, 1938 |
| 2,122,703 | Weinreich | July 5, 1938 |
| 2,155,995 | Robb | Apr. 25, 1939 |
| 2,188,837 | Gregory et al. | Jan. 30, 1940 |
| 2,405,879 | Fredricksen | Aug. 13, 1946 |
| 2,535,231 | Rasmusson | Dec. 26, 1950 |
| 2,625,120 | Eddy et al. | Jan. 13, 1953 |

FOREIGN PATENTS

| | | |
|---|---|---|
| 323,084 | Great Britain | Dec. 24, 1929 |